Figure 1:
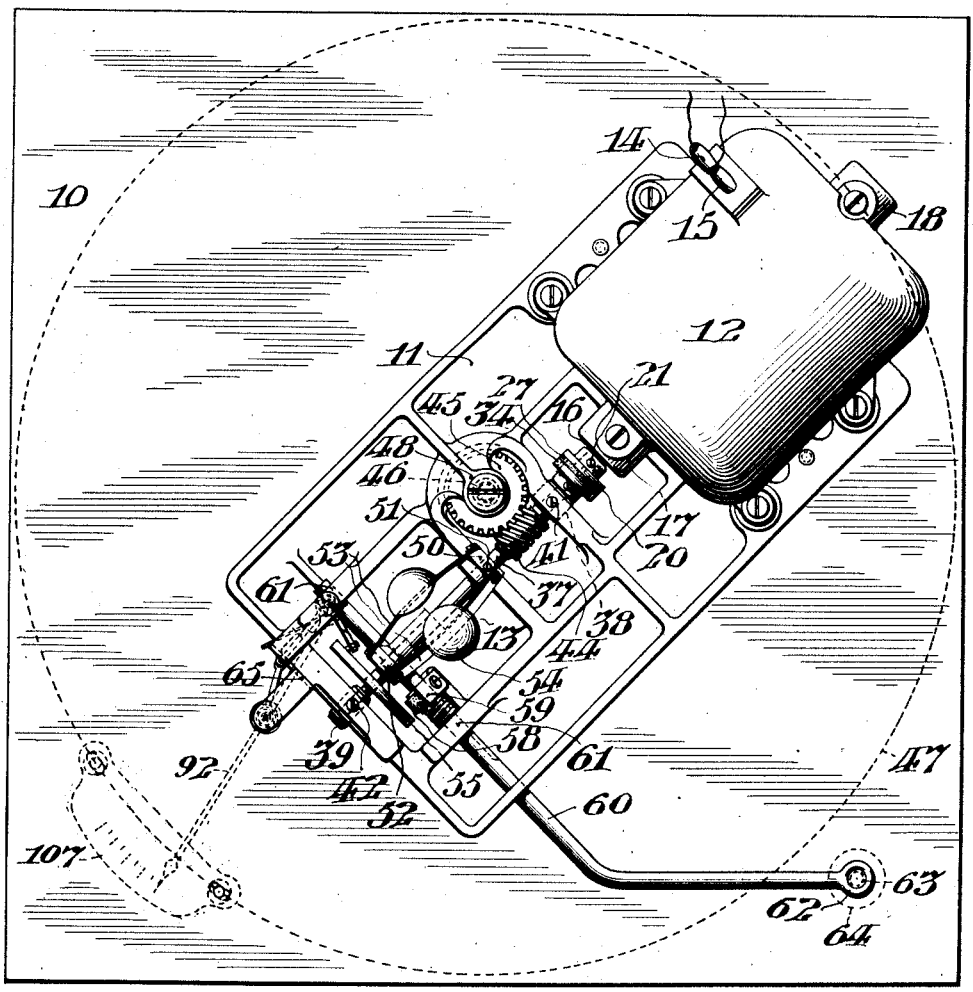

H. H. MURRAY & W. D. LA RUE.
COMBINED DRIVING, GOVERNOR, SPEED REGULATING AND SPEED INDICATING MECHANISM FOR TALKING MACHINES.
APPLICATION FILED NOV. 11, 1912. RENEWED JULY 9, 1917.

1,256,154.

Patented Feb. 12, 1918.
3 SHEETS—SHEET 1.

INVENTORS
HENRY H. MURRAY
AND
WILLIAM D. LA RUE,

WITNESSES

BY

ATTORNEY

H. H. MURRAY & W. D. LA RUE.
COMBINED DRIVING, GOVERNOR, SPEED REGULATING AND SPEED INDICATING MECHANISM FOR TALKING MACHINES.
APPLICATION FILED NOV. 11, 1912. RENEWED JULY 9, 1917.
1,256,154.
Patented Feb. 12, 1918.
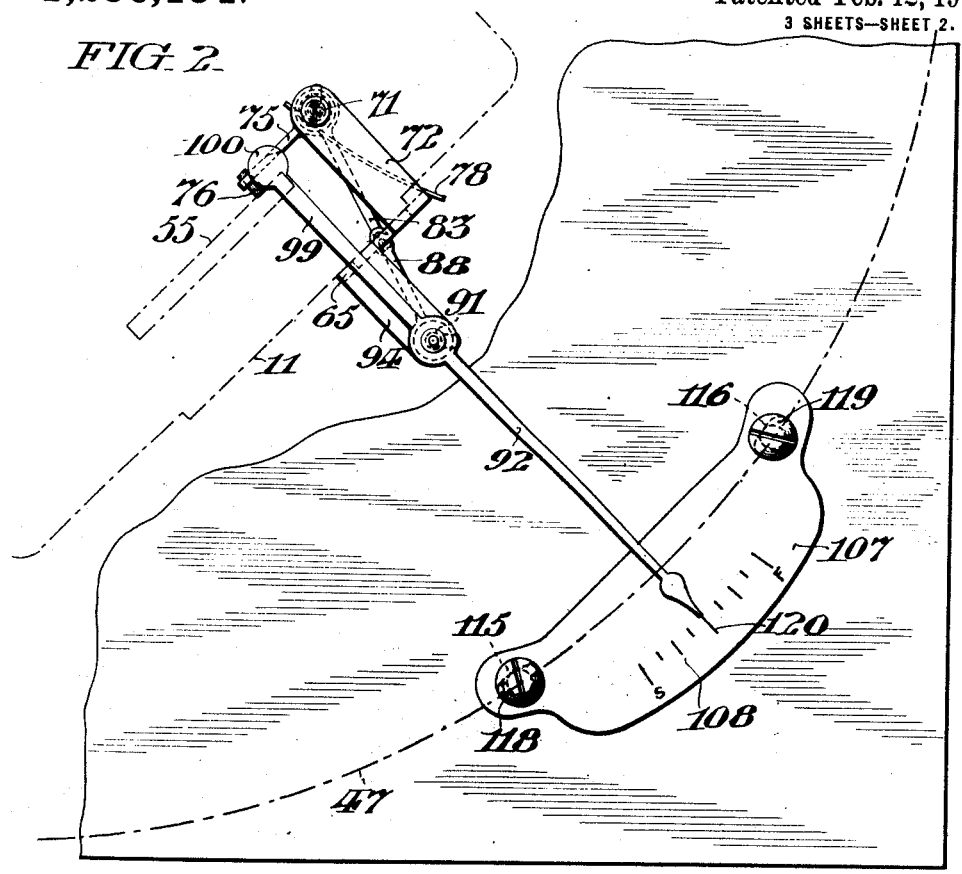
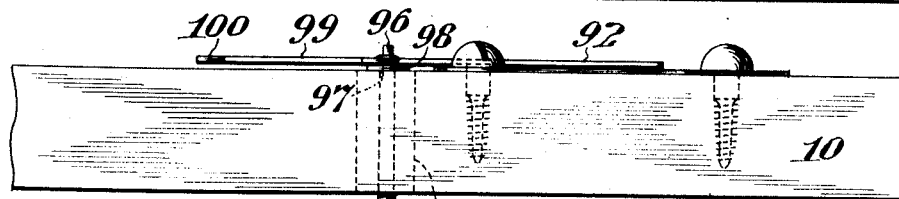
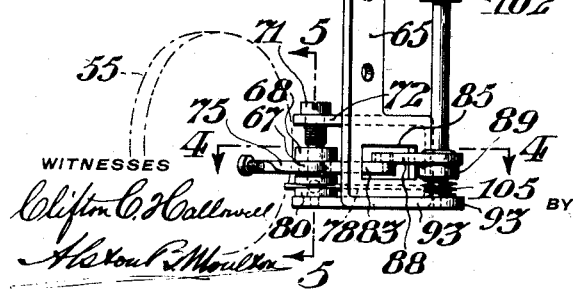
INVENTORS
HENRY H. MURRAY
AND
WILLIAM D. LA RUE,
ATTORNEY

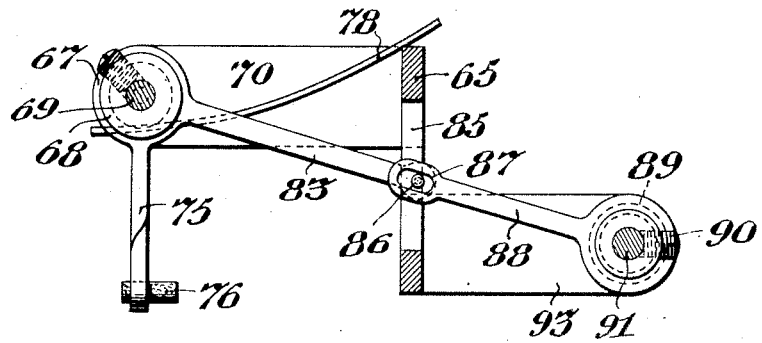
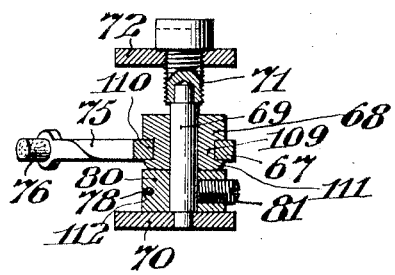
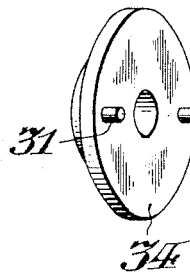
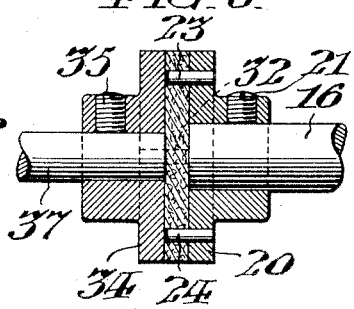
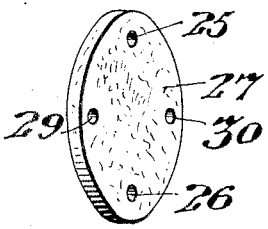

UNITED STATES PATENT OFFICE.

HENRY H. MURRAY, OF RIVERTON, AND WILLIAM D. LA RUE, OF CAMDEN, NEW JERSEY, ASSIGNORS TO VICTOR TALKING MACHINE COMPANY, A CORPORATION OF NEW JERSEY.

COMBINED DRIVING, GOVERNOR, SPEED-REGULATING, AND SPEED-INDICATING MECHANISM FOR TALKING-MACHINES.

1,256,154.         Specification of Letters Patent.         Patented Feb. 12, 1918.

Application filed November 11, 1912, Serial No. 730,595. Renewed July 9, 1917. Serial No. 179,573.

*To all whom it may concern:*

Be it known that we, HENRY H. MURRAY and WILLIAM D. LA RUE, both citizens of the United States, and residents of Riverton, county of Burlington, and State of New Jersey, and city of Camden, county of Camden, and State of New Jersey, respectively, have invented certain new and useful Improvements in Combined Driving, Governor, Speed - Regulating, and Speed - Indicating Mechanism for Talking-Machines, of which the following is a specification, reference being had to the accompanying drawings.

This invention particularly relates to mechanism for indicating a predetermined constant speed, and is especially applicable to talking machines, wherein, as is well known, it is essential that the record carrying turntable be rotated at substantially the same speed at which the original of the record to be carried thereby was recorded.

The principal objects of this invention, broadly defined, are to provide talking machine mechanism including a sound record carrier having driving means adapted to be rotated at a predetermined constant speed, with simple and efficient means to indicate any deviation from the fixed speed of rotation; to provide yielding connections between the coöperative parts of said mechanism, arranged to absorb or arrest any vibrations which would tend to in any way interfere with the smooth running of the sound record carrier, or to impart a vibratory motion to the visual indicating member of the indicating means; and to provide said yielding connections with engaging means which may be disengaged by merely separating the parts.
Other objects of this invention are, to provide governing means operative to determine the speed of rotation of the coöperative parts of the talking machine mechanism; to provide means connected with the governor, operative to visibly indicate and greatly magnify a comparatively slight relative movement of the governor parts; to provide a dial-plate circularly adjustable with respect to the indicating means; and to provide means adjustable to vary the speed of said governor.

This invention specifically defined includes, with other essential talking machine elements, a sound record carrier, a governor, a motor having a yielding connection with said sound record carrier and governor, operative to absorb or arrest any vibration due to the rotation of said motor, an adjustable pad operatively supported to engage the governor disk, to determine the speed of rotation of said governor, and a speed indicator comprising a visual indicating member connected to be actuated by the movement of the governor disk, and comprising a series of loosely connected levers so correlated as to afford a relatively great movement of the visual indicating member, effected by a comparatively slight movement of the governor disk.

This invention further includes all of the various novel features of construction and arrangement hereinafter more definitely specified.

In the accompanying drawings, Figure 1 is an inverted plan view of the motor-board of a talking machine having the mechanism, including the motor, governor, speed-regulating mechanism and speed-indicating mechanism, conveniently embodying this invention, attached thereto, said parts being shown in their inoperative position; Fig. 2 is a fragmentary plan view of a portion of the motor-board and the indicating means *per se*, in operative position, the governor disk, supporting frame and turntable being indicated in dot-and-dash lines, for convenience of illustration; Fig. 3 is a side elevational view of the structure shown in Fig. 2; Fig. 4 is a plan sectional view taken on the line 4—4 in Fig. 3; Fig. 5 is a transverse vertical sectional view taken on the line 5—5 in Fig. 3; Fig. 6 is a central vertical sectional view showing the yielding connection between the motor and governor; Fig. 7 is a perspective view of the coupling member on the driving-shaft; and Fig. 8 is a perspective view of the yielding coupling member disposed between the coupling members on the driving shaft and motor shaft, respectively.

In said figures, the motor-board 10 has secured to its under surface the frame 11, which carries the electric motor 12 and governor 13 of a talking machine. The motor 12 has the lead connections 14 and 15 and the shaft 16 mounted in suitable bearings 17 and 18 in the frame 11, said shaft 16 being provided with the coupling member 20 secured thereto by the set-screw 21, and having pins or projections 23 and 24 extending from the face thereof, in parallel relation to the axis of said shaft, as best shown in Fig. 6, into suitable apertures 25 and 26 in the coupling disk 27 formed of leather, felt, or other suitable yielding material. Said coupling disk 27 is also provided with suitable apertures 29 and 30, arranged to respectively receive the pins or projections 31 and 32 projecting from the coupling member 34, which is conveniently secured by the set-screw 35 on the driving shaft 37, which is mounted in suitable bearings 38 and 39, respectively secured in removable relation in suitable hangers depending from the frame 11, by the set-screws 41 and 42.

The driving shaft 37 carries the worm 44 in toothed engagement with the worm-gear 45 on the shaft 46 of the record carrying turntable 47, said turntable shaft 46 being suitably mounted in the bearing 48 in the frame 11, and extending freely through the motor-board 10, to support the turntable for rotation above said board.

The governor 13 comprises the hub 50 secured to an extension of the driving shaft 37 by the set-screw 51, and the hub 52 slidable axially on said shaft and connected with the hub 50 by the strap springs 53 carrying the weighted governor balls 54, which by their centrifugal action when rotated tend to shift the hub 52 axially toward the hub 50 in a well known manner. The hub 52 is conveniently provided with the circular governor disk 55, which is connected to be shifted axially with said hub, and whose axial movement toward the hub 50 is arranged to be limited when the rotation of the governor assumes a predetermined speed, by the friction pad 58, which is conveniently carried by the lever 59 on the rock-shaft 60.

The rock-shaft is suitably mounted in bearings 61 in the frame 11, and has its free end bent at an angle to its axis of oscillation, and provided with an enlargement 62 arranged to be engaged by the thumb-screw 63, having the head 64 projecting through the motor-board 10, for its convenient adjustment by the operator, to vary the rotation of the turntable to the predetermined speed suitable for the reproduction of the sound record carried by said turntable.

The speed indicator is carried by the frame or bracket 65, which is detachably secured to the frame 11, shown in Figs. 1 and 2, and comprises the bell crank lever 67, having the hub 68 secured on the pintle 69, which has its opposite ends reduced and respectively mounted to rotate in suitable apertures in the arm 70 of the bracket 65, and the bearing screw 71, which is in threaded engagement with and adjustable relatively to the arm 72, to take up any wear of the shoulders formed by the reduced ends of the pintle 69.

The short arm 75 of the bell crank lever 67 conveniently carries at its free end the pad 76 of felt, leather, or other suitable material, which is arranged to bear against the inner face of the governor disk 55, and which is maintained in contact therewith by the spring 78, preferably formed of a normally straight piece of spring wire engaged in the collar 80, which is secured on the pintle 69 by the set-screw 81, said spring 78 having its free end engaging the frame 65, as best shown in Fig. 4.

The bell crank lever 67 is also provided with the relatively long arm 83, which is disposed in acute angular relation with respect to the short arm 75, and which extends through an opening 85 provided therefor in the bracket 65. The lever arm 83 is provided at its free end with the pin or projection 86 extending loosely into the slot 87 in the relatively short lever 88, having the hub 89 secured by the set-screw 90 on the shaft 91 of the indicator pointer 92, it being noted that the width of the slot 87 in the lever 88, as best shown in Fig. 4, is slightly wider than the diameter of the projection 86, which is arranged to be engaged by the walls of said slot, whereby any unavoidable inequalities in the governor disk 55 which may tend to vibrate the bell crank lever 67 in an oscillatory manner, will be compensated for by the slight play and relative movement of the arm 83 and the lever 88, so that, as will be observed, such unavoidable oscillation of the bell crank lever 67 will not be imparted to the shaft 91, and, consequently, to the visual pointer 92.

The shaft 91 is conveniently mounted to oscillate in the bearings in the arms 93 and 94 of the bracket 65, and extends freely through the aperture 95 in the motor-board 10. Said shaft 91 has its upper end 96 reduced to form the shoulder 97, with which the hub 98 of the pointer 92 engages, said pointer 92 being secured in rotatably adjusted relation on said shaft and being counterbalanced by a rearwardly extending tailpiece 99 having an enlarged counterweight 100.

The shaft 91 is maintained axially adjusted by the collar 102, secured thereon by the set-screw 103 and maintained in frictional contact with the arm 94 of the bracket 65 by the spring 105, which is interposed between the hub 89 of the lever 88 and the arm 93 of said bracket 65.

It will be readily seen that any axial movement of the governor disk 55 will effect oscillation of the bell crank lever 67, which will impart through the short arm 75 and long arm 83 of the bell crank lever 67 and the short lever 88 and shaft 91 a movement of the pointer 92 of considerably greater magnitude than the axial movement of the governor disk 55, and thereby visibly indicate on the face of the dial-plate 107, which is provided with graduations 108, any deviation either slow or fast from the predetermined speed of rotation of the governor, and consequently the predetermined speed of rotation of the turntable, which is directly connected with said governor.

Referring to Fig. 5, it will be seen that the bell crank lever 67 is provided with a hub 68, which is connected therewith by slipping its shank 109 through a suitable aperture 110 in said bell crank lever and upsetting the outer free end of said shank 109, as shown at 111, it being noted that the hub 89 is secured to the lever 88, and the hub 98 is conveniently secured to the pointer 92 in a similar manner.

Again referring to Fig. 5, it will be seen that the spring 78 is conveniently connected with the collar 80 by being inserted in a saw-cut or like slot 112, the walls of which are subsequently upset to prevent the accidental displacement of said spring from said collar.

As best shown in Fig. 2, the dial-plate 107 is provided with slots 115 and 116 at its opposite ends, through which the securing screws 118 and 119 extend, the major axes of said slots being substantially coincident with an arc whose center is coaxial with the axis of rotation of the turntable, whereby said plate may be adjusted to register its central or neutral graduation 120 with the pointer without changing the relation of the talking machine mechanism within the casing.

The mechanism above described operates as follows: The normal speed at which the turntable carrying the sound record disk is to rotate being determined, the speed regulator is adjusted by the rotation of the thumb-screw 63 to set the friction-pad 58 in position to limit the axial movement of the governor disk 55, and the pad 76 of the speed-indicating mechanism so positioned in the arm 75 of the bell crank lever 67 that when its engaging surface is in a plane with the surface of the pad 58, the pointer 92, which may be rotatably adjusted on the shaft 91, registers with the central scratch or line 120 of the graduations 108 on the dial-plate 107.

The speed-regulating and speed-indicating parts being thus adjusted, the current may be supplied to the motor 12, which effects rotation of the motor-shaft 16, and a consequent rotation of the driving-shaft 37 through the resilient coupling comprising the coupling members 20 and 34 and the interposed yielding disk 27, which tends to absorb or arrest any vibrations or uneven rotation of the motor and thereby refines the power to such an extent as to effect a rotation of the driving-shaft 37 free from variation or vibration.

Such even rotation of the driving-shaft 37 affords a continuous engagement of the cooperative working surfaces of the worm 44 and its worm-gear 45 on the shaft 46 of the turntable 47, so that a smooth continuous and unvariable rotation of the turntable is effected, which is highly essential in talking machine mechanism, wherein, as is well known, any vibration not caused by the reproducer has undesirable effects upon the reproduction of the record, and any variation caused by a jerking or uneven motion of the turntable, although the difference of speed may not be visible, greatly impairs the relative pitch of the successive sounds or tones reproduced by the record.

The rotation of the driving-shaft 37 effects, through the centrifugal action of the governor weights or balls 54, an axial movement of the governor disk 55 toward the engaging surface of the pad 58, by which said axial movement is limited.

Such axial movement of the governor disk effects a rocking movement of the bell crank lever 67 in opposition to the tension of the spring 78 from the position shown in Fig. 1 to the position shown in Fig. 2, by the engagement of said disk with the pad 76 in the short arm 75; the long arm 83 of said bell crank lever being loosely connected with the relatively short lever 88, which is secured to the shaft 91 of the comparatively long pointer 92, produces a greatly magnified movement of the point of the pointer over the graduations 108 on the dial-plate 107.

In assembling the talking machine parts, the pad 76 is so inserted that when the desired speed of the record carrying turntable 47 is attained, the pointer 92 will register with the central or neutral graduation scratch or line 120 on the dial-plate 107, when said plate is so disposed that the securing screws 118 and 119 extend centrally through their respective slots 115 and 116. It will be seen that should the pointer 92 from any cause, such as is due to wear, or from possible warping of the motor-board, fail to properly register with the graduation corresponding to the speed of the turntable which said graduation is intended to indicate, said plate may be adjusted, when the screws 118 and 119 are loosened, within the range of circular movement afforded by the slots 115 and 116, to a position to properly register its graduations with the pointer 92 in accordance with the speed of the turntable 47.

It may be here noted that by the coöperative effect of the resilient connection between the motor 12 and governor 13, and the loose connection between the lever 88 and arm 83 of the bell crank lever 67, any unavoidable vibrations due to inequalities of the running of the motor, or any inaccuracies in assembling the parts, are absorbed or arrested within the mechanism and thereby prevented from being imparted to the visual indicator pointer 92.

It will be obvious that a coupling constructed in accordance with this invention provides a yielding connection which affords a slight rotary play to prevent any slight and sudden variation in the natural rotation of the motor from being transmitted to the driving-shaft, whereby an even rotation of the turntable and governor and the parts connected therewith will be effected, and, consequently, any undue strain thereon prevented.

Furthermore, it will be seen that the fitting of the parts in assembling is greatly facilitated, owing to the fact that the absolute alinement of the motor-shaft and the governor-shaft is not required, and that by the employment of such construction and arrangement of the parts, said shafts and the respective parts carried thereby may be readily separated and removed by merely drawing the abutted ends of the shafts apart.

It may also be observed that the speed-indicating mechanism is positively actuated by mechanical transmission, providing means directly connected with the governor disk, which is primarily shifted by the centrifugal action of the governor weights or balls, and that the transmission means bearing directly upon the governor disk affords but slight friction to be overcome, and being always in contact therewith effects a quick action of the indicator pointer.

Moreover, by reason of the relative length of the long pointer 92 and its connected relatively short lever 88, and the comparatively long and short arms 83 and 75 of the bell crank lever 67, respectively connected with the lever 88 and engaging the governor disk 55, a comparatively slight axial movement of said governor disk effects a greatly magnified movement of the speed-indicating pointer over the graduations 108 of the dial-plate 107.

It may be here stated that when the parts of the indicator mechanism have been assembled and the position of the governor disk 55 determined, the pointer 92 may be rotatably adjusted on the shaft 91, to register its point with the scratch line 120 of the graduations 108.

It is not desired to limit this invention to the precise details of construction and arrangement herein set forth, as various modifications may be made therein without departing from the essential features of the invention as defined in the appended claims.

Having thus described our invention, we claim:

1. In mechanism of the class described, the combination with a rotary member, of a driving-shaft, a governor having means movable axially in accordance with the speed of rotation of said shaft, a speed-indicator, a lever having one end in engagement with the movable governor member, and the other end loosely connected to actuate said speed-indicator, and having a slight relative play with respect thereto, to compensate for any vibration or inequalities in the rotation of the movable governor member, and means operatively connected to rotate said driving-shaft.

2. In a speed indicator, the combination with a governor having a member the position of which is determined by the speed of rotation of said governor, of a pivoted lever in engagement with said movable member, a second pivoted lever, and a pointer operated by said second lever, one of said levers being provided with a slot and the other of said levers being provided with a projection loosely fitting into said slot whereby minute changes in the position of said governor member are not transmitted from said first lever to said second lever and to said pointer.

3. In mechanism of the class described. the combination with a rotary member, of a driving-shaft operatively connected to rotate said rotary member, means movable in accordance with the speed of rotation of said driving-shaft, an oscillatory speed-indicator, a shaft for said speed-indicator, a frame providing suitable bearings for said shaft, a lever on said shaft having an elongated slot in its free end, a bell crank lever having one arm engaged with said movable member and the other arm provided with a projection extending into said slot, of less diameter than the width of said slot, an adjusting screw in said frame providing a bearing, a pintle for said bell crank lever having a trunnion supported in said frame, and a trunnion supported in the bearing in said adjusting screw.

4. In mechanism of the class described, the combination with a rotary member, of a driving-shaft operatively connected to rotate said rotary member, a governor having a member movable in accordance with the rotation of said driving-shaft, a speed-indicator, a shaft for said speed-indicator, a frame having suitable bearings for said shaft, a lever on said shaft having an elongated slot in its free end, a bell crank lever having one arm provided with a projection extending into said slot, and being of less diameter than the width of said slot, an adjustable pad in the other arm in engagement with the movable governor member, an adjustable screw in threaded engagement with said frame, providing a bearing, a pintle for said bell crank lever, supported at one end in said frame and at the other end in the bearing in said adjustable screw, and a spring secured to said pintle tending to press said adjustable pad into engagement with said movable governor member.

5. In mechanism of the class described, the combination with a rotary member, of a driving-shaft operatively connected to rotate said rotary member, a governor having a member movable in accordance with the rotation of said driving-shaft, a speed-indicator, a shaft for said speed-indicator, a frame having suitable bearings for said shaft, a lever on said shaft having an elongated slot in its free end, a bell crank lever having one arm provided with a projection extending into said slot, and being of less diameter than the width of said slot, an adjustable pad in the other arm in engagement with the movable governor member, an adjusting screw in said frame, providing a bearing, a pintle for said bell crank lever supported at one end in said frame and at the other end in the bearing in said adjusting screw, a spring secured to said pintle tending to press said adjustable pad into engagement with said movable governor member, and a dial-plate having graduations for said indicator, and provided with slots through which securing means may be extended to permit adjustment of said dial-plate with respect to said speed-indicator.

6. In mechanism of the class described, the combination with a rotary member, of a driving shaft, a governor having a member movable in accordance with the speed of rotation of said driving shaft, a rock shaft, a lever secured to said rock shaft having its free end slotted, a pointer carried by said rock shaft and adjustably secured thereon, a pivoted lever having means on one end engageable with said movable governor member and having a projection on the other end loosely engaged in the slot of said slotted member.

In witness whereof, we have hereunto set our hands this 8th day of November, A. D. 1912.

HENRY H. MURRAY.
WILLIAM D. LA RUE.

Witnesses:
 FRANK B. MIDDLETON, Jr.,
 JOHN D. MYERS.